United States Patent
Kruk

(10) Patent No.: US 12,041,020 B2
(45) Date of Patent: Jul. 16, 2024

(54) SYSTEM AND METHOD FOR ASYNCHRONOUS MESSAGING COMBINED WITH A REAL-TIME COMMUNICATION

(71) Applicant: Livechat Software S.A., Wroclaw (PL)

(72) Inventor: Konrad Kruk, Wroclaw (PL)

(73) Assignee: LIVECHAT SOFTWARE S.A., Wroclaw (PL)

( * ) Notice: Subject to any disclaimer, the term of this patent is extended or adjusted under 35 U.S.C. 154(b) by 5 days.

(21) Appl. No.: 17/588,297

(22) Filed: Jan. 30, 2022

(65) Prior Publication Data

US 2022/0400093 A1 Dec. 15, 2022

Related U.S. Application Data

(60) Provisional application No. 63/210,078, filed on Jun. 14, 2021.

(51) Int. Cl.
 *H04L 51/046* (2022.01)
 *H04L 51/04* (2022.01)

(52) U.S. Cl.
 CPC ............ *H04L 51/046* (2013.01); *H04L 51/04* (2013.01)

(58) Field of Classification Search
 CPC ............................ H04L 51/046; H04L 51/04
 See application file for complete search history.

(56) References Cited

U.S. PATENT DOCUMENTS

| | | | | |
|---|---|---|---|---|
| 9,191,492 B1 * | 11/2015 | Miller | ................ | H04M 1/72469 |
| 9,350,692 B1 * | 5/2016 | van As | ................ | H04L 51/216 |
| 10,616,415 B1 * | 4/2020 | Howard | ................ | H04M 3/5141 |
| 11,258,622 B2 * | 2/2022 | Christian | ............ | H04L 12/1859 |
| 2002/0087704 A1 * | 7/2002 | Chesnais | ................ | H04L 51/066 709/228 |
| 2005/0105712 A1 * | 5/2005 | Williams | ................ | G10L 13/027 704/275 |
| 2006/0235966 A1 * | 10/2006 | Rossow | ................ | G06Q 10/10 709/224 |
| 2008/0172462 A1 * | 7/2008 | Carrer | ................ | G06Q 10/00 709/204 |
| 2009/0249359 A1 * | 10/2009 | Caunter | ................ | G06F 9/542 715/764 |
| 2013/0185081 A1 * | 7/2013 | Cheyer | ................ | H04M 1/7243 704/275 |
| 2014/0101262 A1 * | 4/2014 | Wu | ................ | H04L 51/04 709/206 |
| 2014/0372551 A1 * | 12/2014 | Fleck | ................ | H04W 8/005 709/213 |
| 2016/0255139 A1 * | 9/2016 | Rathod | ................ | H04N 1/32101 709/203 |
| 2016/0314111 A1 * | 10/2016 | Fougner | ................ | H04L 51/046 |

(Continued)

*Primary Examiner* — Suraj M Joshi
*Assistant Examiner* — Jaren Means
(74) *Attorney, Agent, or Firm* — BelayIP

(57) ABSTRACT

A system and method for asynchronous communication in connection with real-time communication channels is disclosed. The system facilitates the interaction between instant communication channels in case of no chat operators being available with the possibility to continue the communication in the other channel as for example email in an asynchronous manner. It further provides that the communication thread remains untouched and that both the chat operator as well as end-user can easily continue communication in the selected channel.

17 Claims, 10 Drawing Sheets

(56) References Cited

U.S. PATENT DOCUMENTS

| | | | |
|---|---|---|---|
| 2017/0026333 A1* | 1/2017 | Pitroda | H04L 51/046 |
| 2017/0142166 A1* | 5/2017 | Lawson | H04L 65/1023 |
| 2018/0212904 A1* | 7/2018 | Smullen | H04L 51/04 |
| 2018/0260782 A1* | 9/2018 | Bay | H04L 51/046 |
| 2019/0036853 A1* | 1/2019 | Denoue | G06F 40/174 |
| 2019/0273790 A1* | 9/2019 | Zhao | H04L 51/046 |
| 2019/0312878 A1* | 10/2019 | Brown | H04L 63/045 |
| 2020/0195458 A1* | 6/2020 | Christian | H04L 12/185 |
| 2020/0265835 A1* | 8/2020 | Ni | G06F 3/167 |
| 2020/0349614 A1* | 11/2020 | Batcha | H04M 3/5141 |
| 2020/0366628 A1* | 11/2020 | Olivera | H04L 63/08 |
| 2021/0176326 A1* | 6/2021 | Carley | G06F 9/546 |
| 2022/0078139 A1* | 3/2022 | Sreenivasan | G16H 80/00 |
| 2022/0215324 A1* | 7/2022 | Bergher | H04M 3/5175 |

* cited by examiner

SYSTEM AND METHOD FOR ASYNCHRONOUS MESSAGING COMBINED WITH A REAL-TIME COMMUNICATION

CROSS REFERENCE TO RELATED APPLICATIONS

This application is based upon and claims priority to U.S. Provisional Application 63/210,089, the contents of which are herein incorporated by reference.

BACKGROUND OF THE INVENTION

Continuity of communication between the chat operator and end-user accessing the chat communication remains one of the most important elements of online-based customer service. On the other hand, the complexity of communication channels disperses the communication flow between different contexts and forms. Depending on the communication channel, the message addressee expects either an instant response or expects to receive the response after a long-time break. Chat communication is often disrupted by a lack of sufficient resources, such as when it comes to the number of chat operators, and, at the same time, chat communication may be disrupted by the end-users' need to suspend the communication for the moment. Providing continuity of communication requires a combination of asynchronous and synchronous communication between the chat operator and end-user.

With regard to asynchronous communication and switching the type of communication, one of the biggest challenges is the maintenance of consistency of communication. Once switching from a real communication tool to, for example, email, it may be the case that the chat operator encounters difficulty in keeping the substantive aspects of communication on and at a high level. What is more, combining asynchronous and synchronous communication requires an instant communication provider to maintain the communication thread in order to display the context of the conversation with no data loss.

At present, known solutions are not fully addressing the above-listed issues and, to the extent such solutions exist, are cumbersome, ineffective, and tend to create a need for communication channels switching that makes currently known solutions more expensive and less accessible.

BRIEF SUMMARY OF THE INVENTION

The present disclosure is directed to asynchronous communication between the chat operator and end-user. It facilitates the possibility of switching from real-time chat communication to asynchronous communication which may further imply other channels usage as for example email. In particular, the present disclosure makes use of different communication channel integration with chat widgets as well as the ability to continue the communication thread uninterrupted.

The present disclosure represents an integral part of chatting systems and improves how the chatting channel operates by the possibility of continuing a communication thread once it is interrupted, on the same or different communication channel. To facilitate the aforementioned, the disclosure further comprises the elements of the end-user-directed interface of the chat widget integrated with an agent interface of the chat widget and other communication channels.

The present disclosure further provides a possibility to trigger an action regarding chat communication continuation that depends on the chat operator's availability (available online or not) as well as other conditions such as 'out of office'. In particular, further to the present disclosure, a chat operator is facilitated in choosing if, under certain circumstances, real-time communication should be available to the end-user or not. In case of lack of such availability, the communication is switched to asynchronous.

The present disclosure is designed in such a way so as to enable integration between instant communication channels and other communication providers as well as in keeping thread consistency.

The present disclosure improves upon the possibility of continuous communication started in an instant communication channel and further continued in the same channel in an asynchronous manner or in another channel asynchronously such as, for example, email.

BRIEF DESCRIPTION OF THE SEVERAL VIEWS OF DRAWING

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the present disclosure.

The above and other aspects of the present disclosure will become more apparent by describing exemplary embodiments in detail below with reference to the accompanying drawings, wherein.

DETAILED DESCRIPTION OF THE INVENTION

Figure 1:
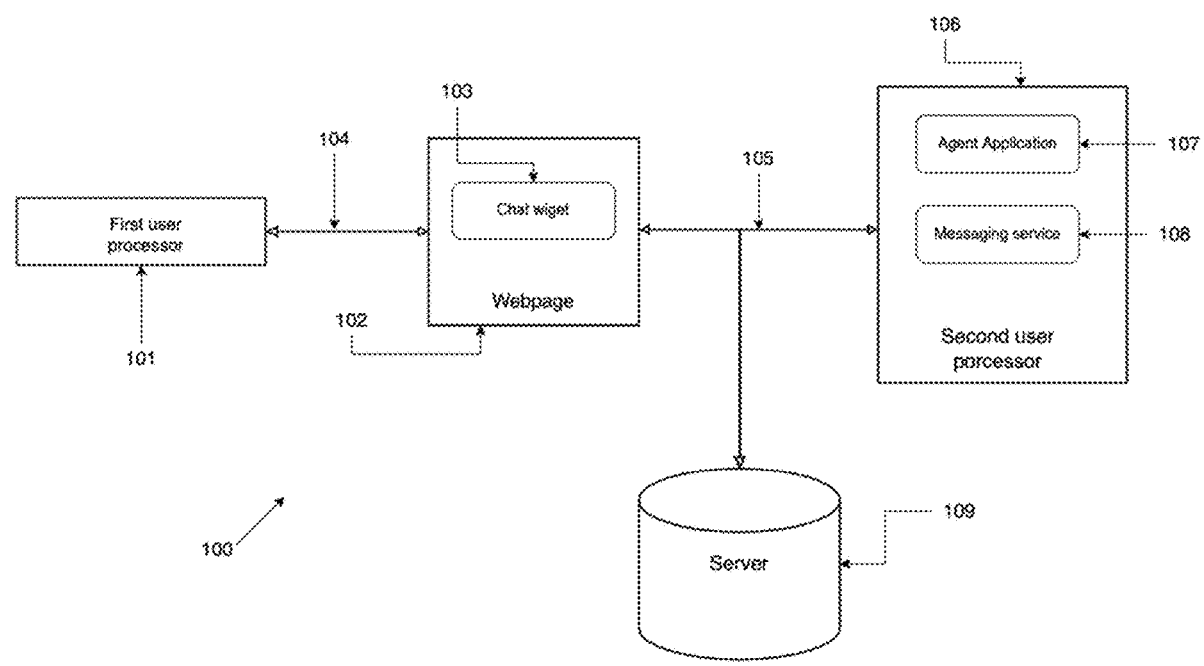
FIG. 1 depicts a simplified version of interaction between the first user processor, webpage, server, and second user processor.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C. In the figures, the same or functionally identical elements have been provided with the same reference signs.

The present invention facilitates asynchronous communication combined with instant communication channels between at least two users over networked devices. The invention is directed to the field of instant communication that may be switched to asynchronous mode with the continuation of a session and easy access to come back to the communication unit.

Instant messaging is nowadays mostly facilitated by widget-based technologies such as chats or other real-time messaging systems. One of the biggest challenges of such technology is to uphold communication in case visitors go out of the page or switch to another device as the accessibility of the thread is usually based upon session or cache memory. The present invention addresses the challenges of fast access to data once there is an asynchronous and real-time communication applied or in case of any other joint or homogeneous communication continued that requires a switch of contexts. The invention of asynchronous messaging combined with real-time communication facilitates the communication between the agent and end-user or agent and chatbot. Agent, as used throughout, shall be understood as being a person who operates the chat on the side of the business provider and is responsible for communication with potential customers (also referred to as the end-user). Communication, as described above, happens via a chat widget that is defined as embedded on the customer's website and seen by end-users (website visitors) as a small chat box, traditionally displayed in the bottom right corner of the web browser. The chat widget is visible on desktops and mobile devices, either in the browser application or as a part of the mobile application.

The disclosed invention is directed towards the continuation of a thread of communication between the chat operator (second user) and end-user (first user) during channel change and switches from synchronous to asynchronous communication. Synchronous communication should be understood as real-time communication that happens between the chat operator and end-user. Asynchronous communication shall be understood as communication that happens in the dispersal of time. For example, end-user A sends a message to chat operator B at 9 a.m. on Monday, chat operator B is not available at that time, but the message gets delivered and waits for the availability of chat operator B. Then, chat operator B responds to end-user A at 7 p.m. on Monday evening. The message sent by the chat operator B is assigned as a previously settled chat thread. As a consequence, the continuation of communication with all its context is safely preserved. Furthermore, the disclosed invention enables the possibility of changing communication channels as for example continuing a communication started on the chat widget via email.

The present invention begins with the first user processor where the first user (101) can send a message via chat widget (103) located on the webpage (102) to the second user. The first user processor communicates with the webpage via a network (104). The message sent by the first user is further sent to the second user. To display the message and further provide thread-based communication, the content of messages is saved in the database, located on server (109), and processed by the messaging module (108) and agent application (107) located on the processor of the second user (106) to ensure that asynchronous communication is enabled on previously saved data including message content.

The flow of functionality disclosed by FIG. 1 represents a typical instant messaging communication scheme with the additional element of the asynchronous communication enabled by the messaging mode (108) and agent application (107). The presently disclosed invention represents an integral part of chatting systems and improves how chatting channels operate. It further comprises elements of the end-user-directed interface of chat widget and agent interface of chat widget. In this regard, the presently disclosed invention operates with a chat widget that is configured to operate in the following modes:

OUT OF OFFICE MESSAGE: after starting a chat conversation, visitors can see the Out of Office message informing them that no agents are available right now, PRE-CHAT SURVEY: if there is a pre-chat survey configured on the license, it's displayed as usual and must be filled before entering the message, CHAT NOW: an end-user is enabled to start a chat by clicking the Chat Now button and after sending the message (s)he has to enter the email address that will be used to notify him/her about the agent's reply. Alternatively, if no email is provided, the system shall enable a return to the conversation once the end-user revisits the page and comes back to the communication window, SENDING A MESSAGE: if a visitor sends a few pieces of text in consecutive messages over a short period of time, they are all treated as a single message (single thread) and the agent can see the whole text in a single chat. System messages displayed on the timeline confirm all performed actions, CONVERSATION HISTORY: all sent and received messages are always available in Chat Widget as long as the cookies are not deleted; after getting back to the widget, an end-user can read previous messages by scrolling up the screen, GETTING BACK TO CHAT WITH DIRECT CHAT LINK: when getting back to the widget from email notification (click on the direct chat link), the customer can also see all previous messages and continue the conversation either in MM mode (no agents available) or live (agents available). Before doing so, (s)he is asked to fill the pre-chat survey, although the already given email address is pre-filled. Additionally, conversation history and other data (including pre-chat survey answers) would be available only if the user proceeds to direct link from the same device. Otherwise, this visitor will be treated as a first-time visitor (a new identity will be created if a new device is used). Furthermore, once the end-user replies directly to the email received from the system informing about agent response the message sent by both invention users shall be visible in the communication thread, and CLOSING A CHAT: visitor can close the chat manually (x) or wait until it gets closed by inactivity timeout (default system setting shall suggest 10 mins nevertheless the timeout accepted by the system may vary and be up to the selection of the invention user). If a visitor decides to write another message after the chat is closed, the new message appears as a new thread.

The above-listed elements constitute certain conditions for the rotating and assigning of communication to an agent according to predefined conditions saved on the server storage via a messaging service. When a visitor starts a chat via social media messenger or instant messaging channels, there is no option for one to provide one's own email address. As a result, when such a chat is started with all agents offline and an agent replies later, no email notifications about the reply are sent—the reply appears only in the visitor's messenger application. Secondly, when a visitor starts a chat via messenger, the invention does not match his/her identity with previous conversations in the chat widget, which is a reason why the presently disclosed invention provides a database that collects all potentially available data about the end-user accessing the invention as user ID, data collected via cookies, and data from the pre-chat survey if such data are accessible to ensure matching between to keep the consistency of thread communication.

Figure 2:
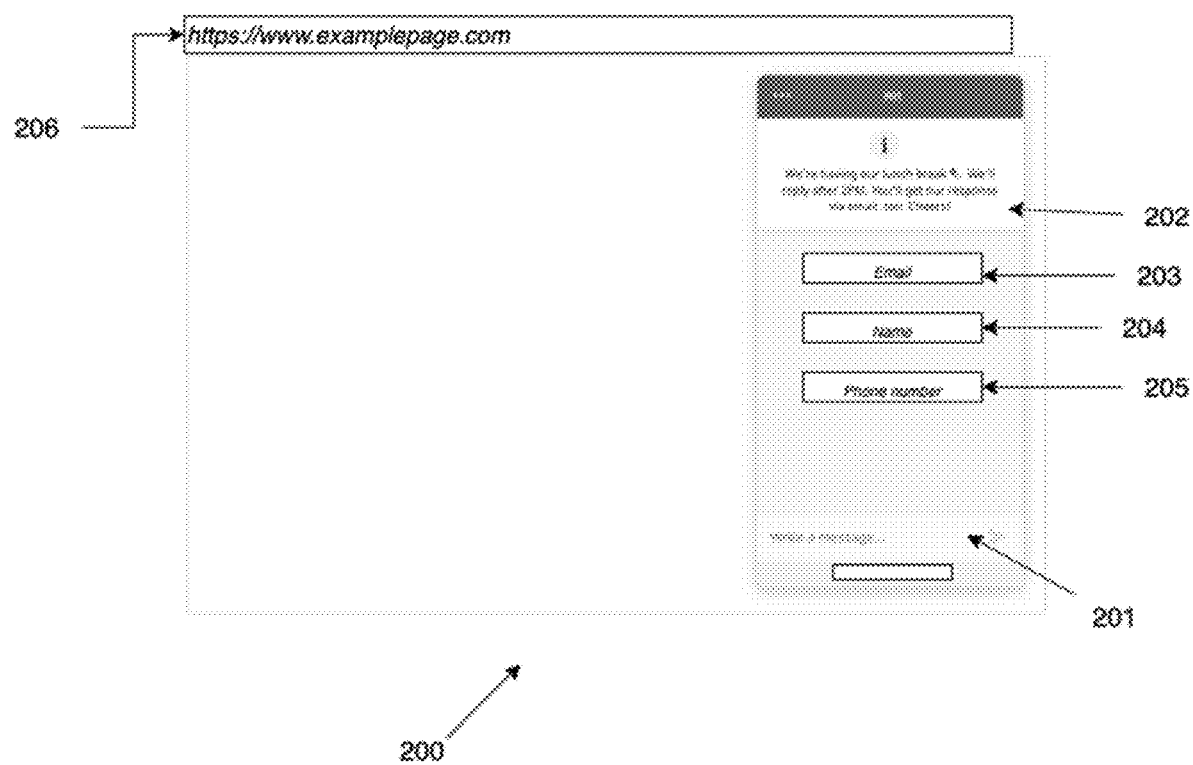
FIG. 2 depicts the location of the chat widget in the context of a webpage with the pre-chat survey and content input being displayed.
Figure 3:
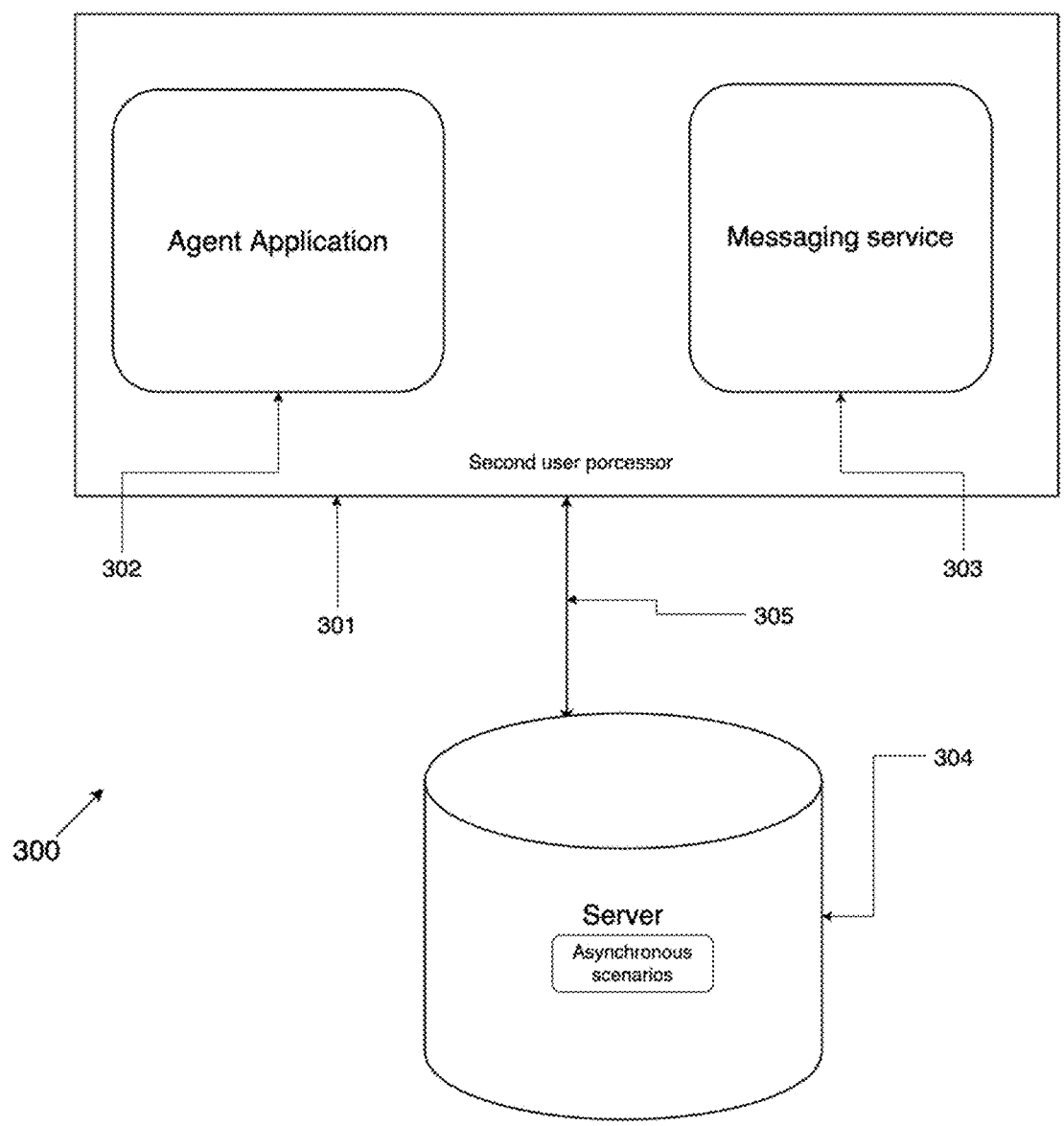
FIG. 3 depicts the simplified version of the interaction between the server storing asynchronous scenarios and the second user processor.
Figure 4:
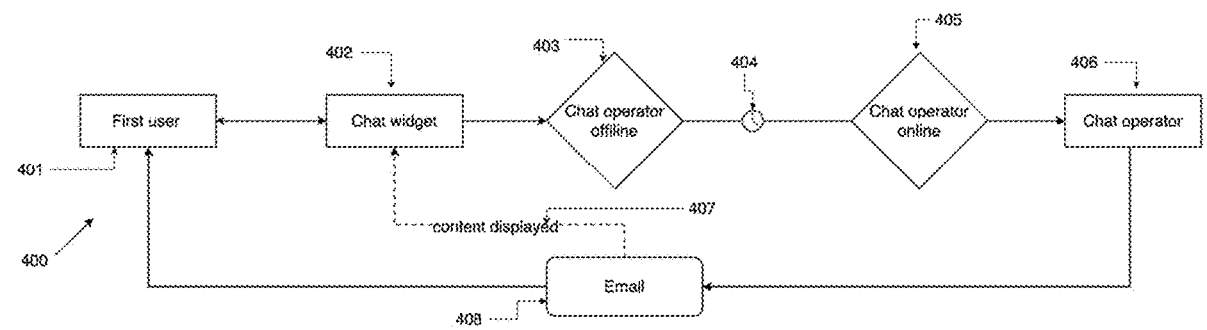
FIG. 4 depicts the flow while the chat operator is offline, and the communication thread is continued via email.
Figure 5:
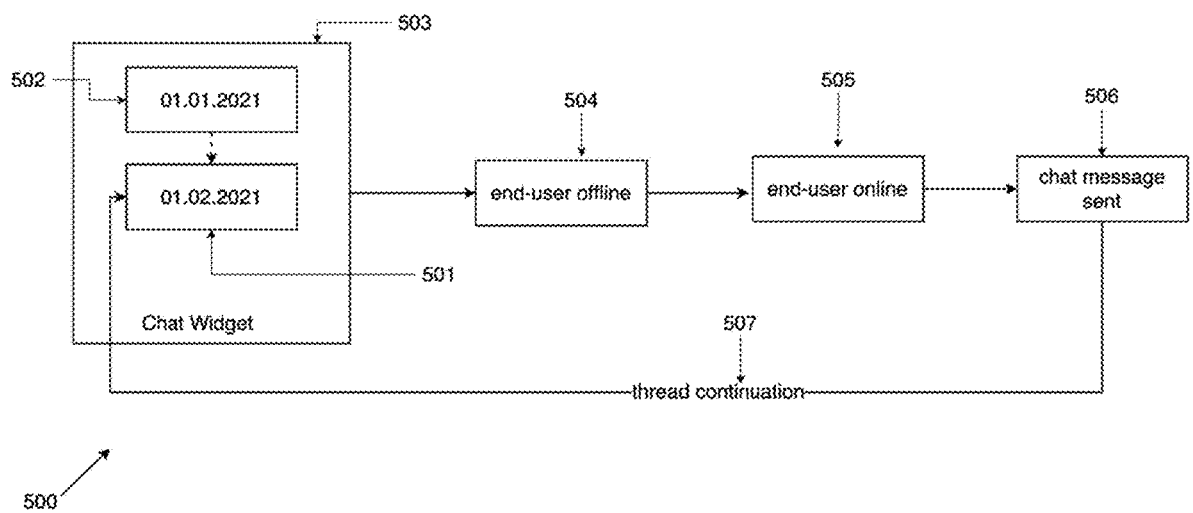
FIG. 5 depicts the flow while the chat operator is offline, and the communication thread is continued via chat widget.
Figure 6:
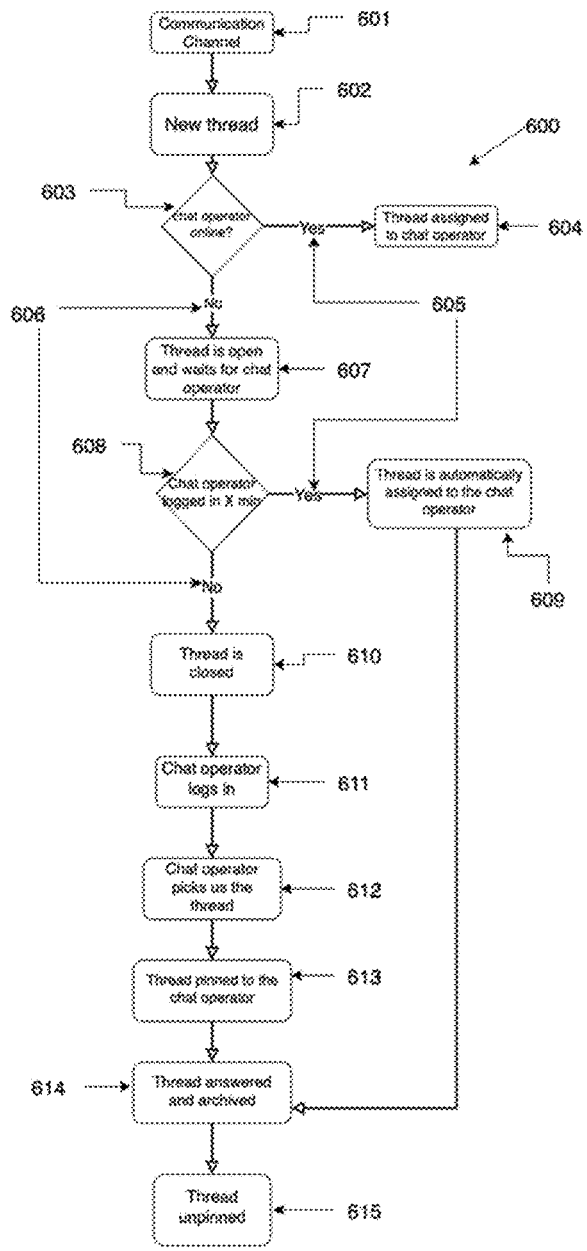
FIG. 6 depicts the detailed flow of the communication in the case of both chat operators being online and offline with the communication thread continuation included.
Figure 7:
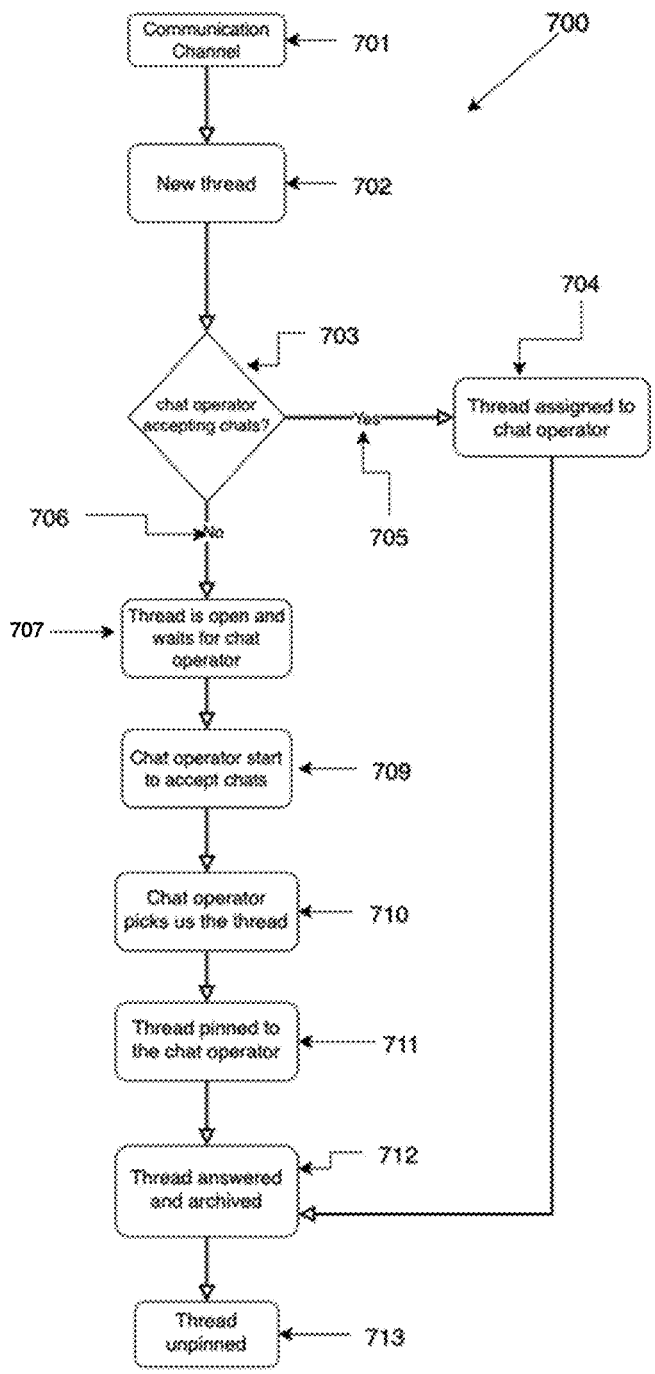
FIG. 7 depicts the detailed flow of the communication in the case of both chat operator accepting and not accepting the incoming chats with the communication thread continuation included.
Figure 8:
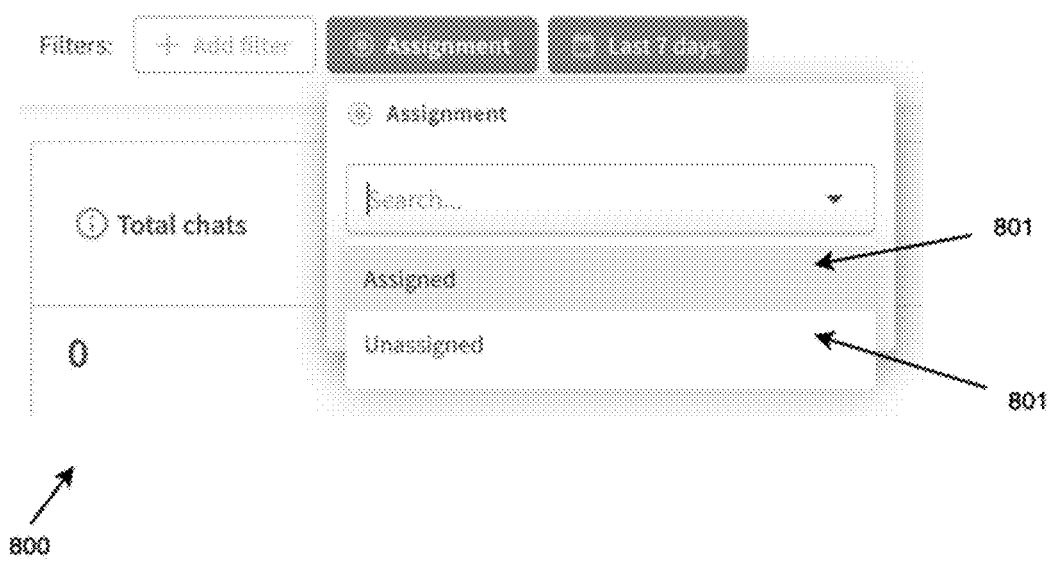
FIG. 8 depicts the assigning chat to the chat operator interface.
Figure 9:
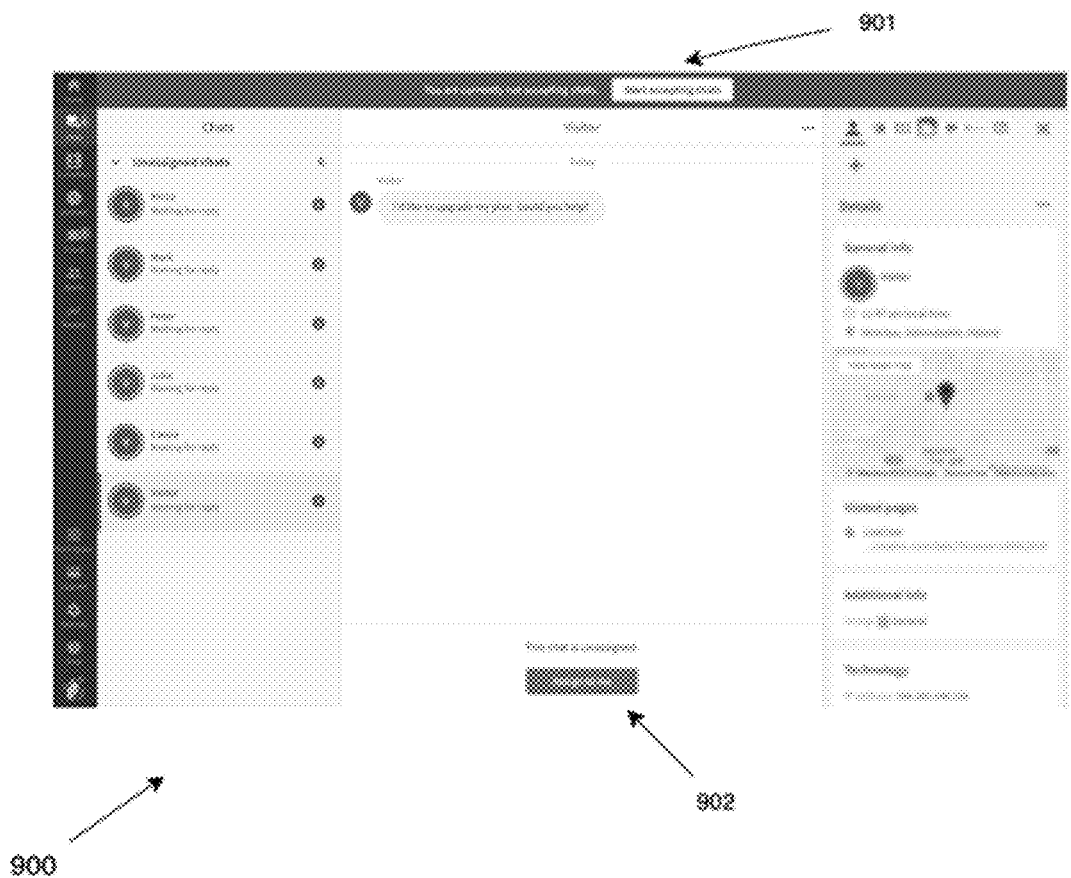
FIG. 9 depicts the start accepting chats and assign to them the option of being displayed in the agent application on the second user processor.
Figure 10:
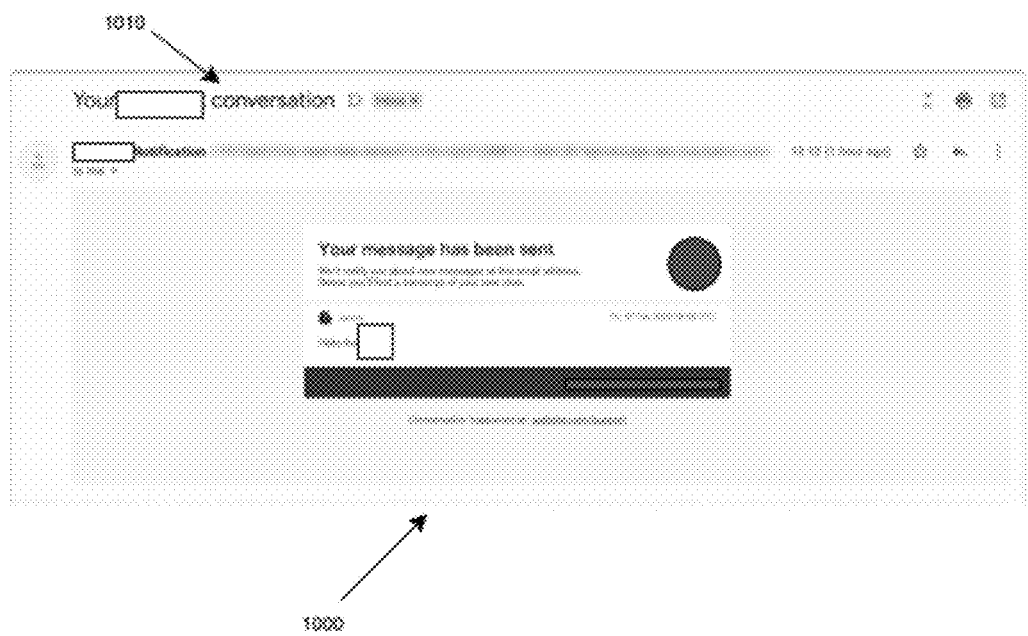
FIG. 10 depicts the communication thread displayed in the email inbox of the first user after the communication thread has been switched to asynchronous communication.

The first user may start communicating with the chat operator via a chat widget located on the webpage (201) with the data disclosure as presented by FIG. 2. In such a case, instant communication may be switched to the asynchronous email communication as the survey requires the first user to add contact details as email (203), name (204) or phone number (205). In such case, the first user can leave a message (201) for the chat operator and the chat operator will be able to come back to the communication thread either within the chat widget or via email (203).

The module for asynchronous communication is located on sever (304) and it further operates on data saved on the server (304) in communication with the second user processor (301) where the agent application (302) and messaging module (303) are configured. Agent application (302) is responsible for a chat operator display that enables messages management. Messaging module (303) is responsible for messages responding and processing of in communication messages. Second user processor and server communicate with each other via network (305) with HTTPS protocols enabled.

The disclosed invention is further configured to operate with different second user statuses as for example chat operator offline. In such case, when the first user (401) sends the message via chat widget (402), while the chat operator is offline (403), the system is configured to wait with further actions on the message (404) and act once the chat operator is online (405). The message is delivered to the chat operator (406) and as the response is sent by the chat operator (406) to the first (401) user via email (408), the content is not only delivered to the email inbox but also displayed in the chat widget (407).

The presently disclosed invention further includes other tracking elements of a system and method steps that enable an agent(s) to track each end-user's status by the following statuses saved in the database:
a. "Waiting for reply"—red text displayed as long as a chat stays unassigned;
b. "Chatting"—green text displayed as long as an end-user is actively chatting (until a chat gets closed manually or by 10 mins inactivity timeout);
c. "Browsing"—gray text is displayed as long as a visitor is actively browsing the website, but not chatting (chat widget closed) or at least the chat widget is opened but there is no active chat going at the moment; and
d. "Left website"—gray text displayed when a visitor leaves the website.

It is further ensured by the invention that in the case of any disruption to the communication thread, as may be the case when the chat operator is offline or the user has left website, the communication thread is continued. Such may be, for example, in the situation where the first user communicates with the agent in the same communication thread in the chat widget (503). The first user exits the page (504) and then returns (505), and a message is sent (506), the message shall belong to the same communication thread according to the presentation in the chat widget (503). The assignment to the communication thread shall be due to the date of the timestamp (501, 502). The communication thread shall be continued regardless of the form of response—synchronous (in the chat widget), asynchronous (for example via email).

A core element of the present invention is to provide a fluent switch between the communication from a real-time messaging system to any other type of communication. Inclusion of a thread started by the instant channel is further continued by other means of communication, such as for example email. The system further enables the sending of a summary of communication to ensure that the link to the content of the before-exchanged information is available to the agent. The communication starts with the communication channel (601) where the first user starts a new thread (602). The system checks if the chat operator is online (603) and if yes, the thread is assigned to the chat operator (604). If the chat operator is not online (606), the thread waits to be assigned until the chat operator logs in (608). If the chat operator logs in within the threshold set up, as a waiting status condition the chat waits to be assigned (608) and is further assigned to the chat operator automatically (609). If the chat operator does not (606) log in to the system, the time assumed by condition 608, the system closes the communication thread (610). The thread opens up and pins the chat operator (613) at the moment when the chat operator logs in (611) and picks up the thread (612). Similarly, the thread is assigned to the chat operator when it is picked up within the time limit of 608. Once the chat operator answers the chat communication and archives it (614), the thread is unpinned (615) from the chat operator.

Similarly, the system and method steps are configured to allow chat assignment from both synchronous and asynchronous communication channels when the chat operator does not accept chats. The communication starts with the communication channel (701) where the first user starts a new thread (702). The system checks if the chat operator accepts chats (703) and if yes (705) the thread is assigned to the chat operator (704). If the chat operator is not accepting chats (706) the thread waits to be assigned (707) until the chat operator starts accepting chats (709). Once the chat operator starts accepting chats (709), the thread is assigned to the chat operator (711) and once answered, the chat operator can archive the thread (712). Then the thread is unpinned (713). Similarly, when the chat is assigned initially and answered, the chat operator can archive the thread (712) and the thread is closed (713).

The system is further configured and arranged to collect data about effectiveness and satisfaction related to messaging during both instant and asynchronous communication and to collect non-verbal, technical parameters about communication flow to display statistics about it to an embodiment of the invention user. The system uses API as a communication interface to connect with channel providers and enable the functionality of the presently disclosed invention. The instant API is configured and arranged to both send and receive API push, calls, or other data as well as receive and send webhooks to trigger actions that are conditional upon them. API of the system requires implementations by components in the following manner.

Service email-handler for handling emails to/from end-users a. Internal API method for accepting HTTP (RPC) webhook that email with thread transcript must be sent to an end-user. This webhook will be sent from the server when a thread must be forwarded to an end-user. There are 2 different situations for thread forwarding (different templates/emails):
   i. End-user left messages in thread, left the thread, and have to get the transcript on thread ended; and
   ii. The agent responded to end-users left messages and a transcript must be sent to the end-user on thread ended;

b. Accepting webhooks from postmark with emails from end-user:
   i. Accept email from postmark; and
   ii. Parse the following data from email:
     1. Message;
     2. sender email; and
     3. chat_ID;
   iii. Verify that the sender email is the same as the end-user's email in given chat_id;
   iv. Verify if the owner and origin of the property that may be indicated in the following manner: continuous_chat_widget_enabled is enabled—if not—send an email response that the end-user cannot respond to that email anymore;
   v. Go to end-user private API and send message to the chat_id from end-user connected with the sender email; and
   vi. If chat is not active (error on message sending)—activate chat with routing continuous property set to true with the message above.

The server of the instant communication channel provider is configured for archiving a thread check if a thread has property routing.email_follow_up and an end-user's email is set:
a. If no agent was event assigned to the thread:
   i. send webhook to email-handler service to trigger sending email to the end-user with thread transcript that (s)he left on the chat; and
   ii. add system message visible to agents only with information that the email notification was sent;
b. If there were any messages from agents not seen by the end-user:
   i. send webhook to email-handler service to trigger sending email to the end-user with thread transcript as a response from an agent; and
   ii. add system message visible to agents only with information that the email notification was sent (a probably different message than the previous one), return new form type email form.

The above-described elements of the system are supporting method steps that enable asynchronous communication between different channels, precisely between chat communication further transferred to email-based communication with a possibility to come back to the communication widget with the thread saved. The applied-for method includes the ability to save communication along with its parameters, track changes and activity of the user engaged in the communication over a chat widget, and then move the communication from one channel to another. As an example, the following situation may be described: visitor starts a conversation with an Agent, Internet connection drops and visitor's browser got shut down, browser's session expires, Agent receives an email or notification in the agent interface in the application that informs about the content of the communication, what are data of the visitor if given and to what channel potential switch may happen. It further provides a link to come back to the thread in the on-site widget, if necessary, independently on the browser's session.

An agent can easily browse chats that are assigned (801) or unassigned (802) regardless of the form of communication that such communication threads include and further make basic actions on the unassigned chats from the end-user's section. Such actions include:
a. Move to the Chats section to view the content and start accepting chats (901);
b. Assign a chat to him/herself (902); and
c. Close and archive to finish communication and save it in the separate storage category.

After the "assign to me button" (902) is clicked, the chat/end-user disappears from the waiting for the reply list and a red dot appears next to the Chats section to indicate that this chat was moved to the My Chats section. Furthermore, the agent can assign multiple chats to him/herself from the end-users list before moving to the chats section to write a message.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

What is claimed is:

1. A system for asynchronous communication combined with an instant communication channel, the system comprising: at least one instant communication widget arranged on a user interface of an infrastructure of the webpage or online application, and wherein the widget is configured to enable real-time interaction when a second user is available and to transition to asynchronous communication when the second user is unavailable;
   second user processors arranged in communication with chat widget and comprising an agent application configured in a networked environment, and wherein the processors include an agent application configured to maintain conversation context for both synchronous and asynchronous communication modes within a networked environment;
   a server arranged in communication with the second user processor and comprising an infrastructure configured to communicate with at least one instant communication widget and the agent application of the second user configured on the second user processor and further configured to dynamically manage a transition of an ongoing conversation from the synchronous to the asynchronous mode based on the second user's availability;
   a messaging service arranged on the server and configured to select an appropriate communication path arranged on the second user processor configured to apply the communication preference for sustaining communication without loss of context between end users and agents, between end users and chatbots, and
   wherein the at least one instant communication widget and the second user processor are configured to communicate with each other asynchronously; and
   wherein the communication path is based on availability of a second user;

wherein the communication is performed between end user and agent, end user and chatbot or between end users;
wherein the communication is performed between a-registered and unregistered users;
wherein chatbot means automated system to perform conversation scenarios integrated natively or via API and webhooks; and
an interface logic configured to automatically suggest a switch of communication modality for conversation participants based on real-time analysis of participants' online status, wherein the logic utilizes artificial intelligence to predict the optimal time for transitioning between synchronous and asynchronous communications to maintain active engagement with users and visitors.

2. The system according to claim 1, wherein the instant communication widget further comprises:
a user input configured to accept at least one of textual content, alphanumeric content or graphic content;
a user display configured to present chat availability and sent and received messages in the communication thread;
wherein the instant communication widget is arranged to be configured on the webpage or online application by the second user; and
wherein the instant communication widget is further configured to communicate with the server infrastructure and messaging services via networked API.

3. The system according to claim 1, wherein the second user processor further comprises:
an agent application arranged on the second processor and configured for asynchronous communication scenarios;
an agent application networked with server infrastructure and messaging services and configured to communicate with the communication widget;
wherein the scenario of asynchronous communication is configured to be triggered upon conditions defined by the second user via the agent application;
wherein the agent application enables to manage configuration of communication channels between the end user and agent; and
wherein the agent application can operate on the server in the cloud environment instead of the second processor.

4. The system according to claim 1, wherein the server infrastructure further comprises a storage server with at least one database, the system further comprising a storage server configured to:
store messages sent by at least the first user structured in at least one thread;
communicate over the network with the agent application used by the second user;
collect the data from the instant communication widget arranged on the processor of the first user via messaging service;
wherein the data saved in the storage server is configured to store threads, users, and individual messages independently;
wherein the storage server is configured to be the cloud server; and
wherein the storage server may include a plurality of databases depending on the type of data saved in the storage server.

5. The system according to claim 1, wherein the messaging service is further configured to:
receive the threads from the instant communication widget from a backend infrastructure via a network;
communicate over an API with the agent application to extract and input data entered by the second user via agent application;
communicate over the API with the chatbot infrastructure to automatically generate responses for the at least one user;
trigger a scenario of asynchronous communication defined by the second user via agent application;
save and adjust the data on the storage server; and
wherein data collected by the messaging service originates from at least one instant communication widget and at least one agent application; and
wherein a messaging module is arranged on a server in a cloud environment.

6. The system according to claim 3, wherein the scenarios of asynchronous communication further comprise:
a list of available agents to assign the communication;
conditions for the rotating and assigning of communication to an agent according to predefined conditions saved on the server storage via messaging service;
re-assigning mechanism that applies if the agent becomes offline;
wherein the re-assignment of the communication is based on the predefined conditions saved on the server storage via messaging services; and
wherein the re-assignment is based on the availability of agents.

7. The system according to claim 2, wherein the pre-chat survey is configured to accept textual and alphanumeric content.

8. A method for asynchronous communication led by means of instant communication channels, the method comprising the steps of:
providing at least one instant communication widget arranged on the processor of the first user and on a user interface of the infrastructure of the webpage or online application;
configuring an agent application on the second user processors arranged in the networked environment;
providing networked communication between a server infrastructure, the instant communication widget, and the agent application of the second user configured on the second user processor;
connecting the messaging service to the networked environment with the agent application and server infrastructure; and
an interface logic configured to automatically suggest a switch of communication modality for conversation participants based on real-time analysis of participants' online status, wherein the logic utilizes artificial intelligence to predict the optimal time for transitioning between synchronous and asynchronous communications to maintain active engagement with users and visitors.

9. The method according to claim 8, further comprising the steps of:
opening a chat widget by at least one user;
enabling a message to be typed in the instant communication widget by the first user;
verifying the message that was sent via the instant communication widget;
enabling the response from the second user via agent application to the message of the first user in the same chat thread;
displaying the response of the second user in the instant communication widget of the first user; and wherein, the response of the second user via agent application was sent after a significant time gap exceeding a regular instant communication; and wherein, the response of the second user that was sent after a significant time gap is displayed in the same communication thread as a message initially sent by the first user via an instant communication widget;

wherein, after opening the chat widget the system can trigger predefined fields display to collect information from at least one of the users; and wherein the communication is performed between end user and agent, end user and chatbot or between end users.

10. The method according to claim 9, further comprising the steps of:

checking the availability of the second user by agent application at the moment when the second user receives the message from the first user sent via instant communication widget;

defining if the second user is accepting incoming chats based on the availability set up in the agent application;

queuing an incoming conversation to the second user via agent application if the availability exists;

assigning the conversation basing on the availability of a second user; and wherein, the availability of the second user via agent application is enabled as a default feature of the Instant communication channels.

11. The method according to claim 9, further comprising the steps of:

defining if the second user is available online via an agent application at the moment when the second user receives the message from the first user sent via an instant communication widget;

defining that the second user is not accepting incoming chats based on the availability set up in the agent application;

saving incoming messages sent by the first user via instant the communication widget as unassigned in the server storage;

pinning the incoming messages sent by the first user via instant communication widget to the second user while the second user is offline;

enabling asynchronous responses to the message sent by the first user;

threading the asynchronous response to the message sent by the first user in the instant communication widget;

enabling the first user to respond in the thread available on the instant communication widget available on the webpage;

enabling the second user to respond in the thread via agent application;

re-assigning the message to available agent via agent application based on the channel that the agent operates; and wherein, asynchronous communication may only time out if the browser session becomes unavailable.

12. The method according to claim 11, further comprising the steps of:

enabling the first user to come back to the instant communication widget after a webpage has been closed;

displaying content of the messages sent by at least the first user in the instant communication widget after a webpage has been closed and the first user returned to it;

restoring the communication with the second user after the instant communication widget has been clicked;

sending a reminder to the first user while there is a new message in the thread; and wherein, the reminder is sent to the email address of the first user.

13. The method according to claim 11, further comprising the steps of:

enabling the first user to choose asynchronous communication via email if the second user is offline;

enabling the first user to choose asynchronous communication in the instant communication widget if the second user is offline; and wherein, the first user is enabled to drop communication by selecting the close option at any stage of communication.

14. The method according to claim 11 defining if the second user is available, further comprising the steps of:

checking agents work schedule;

checking if agent is online;

checking the queue of agent on each communication channel;

checking average response time;

assigning the communication based on the most efficient assignment possibility with regard to agent's parameters;

wherein agent's parameters means work schedule, being online, queue of agent on each communication channel and average response time.

15. The system of claim 1, further comprising:

an automated conversation continuation module on the server configured to compile conversation elements and metadata to facilitate resumption of the conversation with an original or a new second user, regardless of the prior communication modality used, wherein the system enables conversation persistence by leveraging data interchange via APIs and webhooks.

16. The system of claim 1, wherein the server includes a visitor identification module that utilizes tracking technologies to distinguish between registered users and visitors within the communication system and enables personalized engagement with visitors by maintaining a unique conversation thread that persists across different communication channels without the necessity for visitor registration.

17. A method for managing communication in a system for asynchronous communication according to claim 9, the method comprising the steps of:

initiating a communication session via an instant communication widget on a user interface;

detecting an event indicative of a transition from synchronous to asynchronous communication mode when a message is sent by a first user;

automatically preserving the context of the communication session upon detecting event;

storing conversation elements and associated metadata in a server memory, wherein the metadata is indicative of conversation context;

maintaining a continuous conversation thread that bridges the synchronous and asynchronous communication modes by utilizing the stored conversation elements and metadata;

enabling a second user to asynchronously pick up the continuous conversation thread through an agent application when returning online; and facilitating the transition back to synchronous communication mode for the second user via the agent application when the second user is available, thereby sustaining the conversation continuity across different communication modalities.

\* \* \* \* \*